(12) United States Patent
Yoshida et al.

(10) Patent No.: US 11,387,581 B2
(45) Date of Patent: Jul. 12, 2022

(54) ELECTRIC WIRE CONNECTION STRUCTURE

(71) Applicants: FURUKAWA ELECTRIC CO., LTD., Tokyo (JP); FURUKAWA AUTOMOTIVE SYSTEMS INC., Shiga (JP)

(72) Inventors: Sho Yoshida, Tokyo (JP); Akira Tachibana, Tokyo (JP); Kengo Mitose, Tokyo (JP)

(73) Assignees: FURUKAWA ELECTRIC CO., LTD., Tokyo (JP); FURUKAWA AUTOMOTIVE SYSTEMS INC., Shiga (JP)

( * ) Notice: Subject to any disclaimer, the term of this patent is extended or adjusted under 35 U.S.C. 154(b) by 76 days.

(21) Appl. No.: 16/721,535

(22) Filed: Dec. 19, 2019

(65) Prior Publication Data

US 2020/0136277 A1 Apr. 30, 2020

Related U.S. Application Data

(63) Continuation of application No. PCT/JP2018/022056, filed on Jun. 8, 2018.

(30) Foreign Application Priority Data

Jun. 21, 2017 (JP) .............................. JP2017-121107

(51) Int. Cl.
*H01R 4/00* (2006.01)
*H01R 4/62* (2006.01)
(Continued)

(52) U.S. Cl.
CPC .............. *H01R 4/625* (2013.01); *B23K 1/06* (2013.01); *H01R 43/0207* (2013.01); *H01R 43/04* (2013.01); *B23K 2101/32* (2018.08)

(58) Field of Classification Search
CPC .... H01R 4/625; H01R 43/04; H01R 43/0207; H01R 4/72; H01R 4/02; H01B 7/00;
(Continued)

(56) References Cited

U.S. PATENT DOCUMENTS 2,946,119 A * 7/1960 Jones ...................... B22F 7/062
228/110.1
3,002,270 A * 10/1961 De Prisco .............. B23K 20/10
228/110.1
(Continued)

FOREIGN PATENT DOCUMENTS

FR 2555084 A1 * 5/1985
JP H0721843 U 4/1995
(Continued)

OTHER PUBLICATIONS

English translation of Written Opinion for Application No. PCT/JP2018/022056, dated Jul. 17, 2018.
(Continued)

*Primary Examiner* — Kiley S Stoner
(74) *Attorney, Agent, or Firm* — Dorsey & Whitney LLP (57) ABSTRACT

The present disclosure relates to an electric wire connection structure including one or more copper-based conductor covered electric wires having a copper-based conductor covered part and exposed part; and one or more aluminum-based conductor covered electric wires having an aluminum-based conductor covered part and exposed part. An ultrasonic joint part is provided at a conductor stacked part in which the copper-based conductor exposed part and the aluminum-based conductor exposed part are superposed. A total contacting length L which is a summed length of a part at which the copper-based conductor exposed part and the aluminum-based conductor exposed part contact and a summed length x of a contour line of a space S formed at a part at which the copper-based conductor exposed part and
(Continued)

the aluminum-based conductor exposed part are separate in a joint interface of the ultrasonic joint part satisfy a relational expression of $(x/L)\times 100 \leq 10\%$ based on cross-section observation.

6 Claims, 6 Drawing Sheets

(51) Int. Cl.
  *H01R 43/02* (2006.01)
  *H01R 43/04* (2006.01)
  *B23K 1/06* (2006.01)
  *B23K 101/32* (2006.01)

(58) Field of Classification Search
  CPC ............... B23K 1/06; B23K 9/00–328; B23K 11/00–368; B23K 2101/32; B23K 2101/38; B23K 2103/10–12
  USPC ..................... 228/1.1, 110.1, 180.5, 4.5, 904
  See application file for complete search history.

(56) References Cited

U.S. PATENT DOCUMENTS

| | | | | | |
|---|---|---|---|---|---|
| 3,039,333 | A | * | 6/1962 | Jones | B23K 20/106 228/1.1 |
| 3,056,192 | A | * | 10/1962 | Jones | B23K 20/10 228/104 |
| 3,648,014 | A | * | 3/1972 | Bennett | B23K 11/20 219/118 |
| 4,038,743 | A | * | 8/1977 | DuRocher | H01R 4/026 29/869 |
| 4,224,499 | A | * | 9/1980 | Jones | B23K 28/02 219/121.85 |
| 6,538,203 | B1 | * | 3/2003 | Nolle | H01R 4/62 174/840 |
| 7,128,621 | B2 | * | 10/2006 | Onose | H01R 43/0228 439/874 |
| 7,923,637 | B2 | | 4/2011 | Susai et al. | |
| 2011/0198122 | A1 | * | 8/2011 | Sagawa | H01R 4/029 174/84 R |
| 2012/0017481 | A1 | * | 1/2012 | Settles | F41A 17/00 42/25 |
| 2012/0318554 | A1 | * | 12/2012 | Koto | H01R 4/72 174/90 |
| 2012/0318576 | A1 | * | 12/2012 | Koto | H01R 4/625 174/88 R |
| 2014/0110459 | A1 | * | 4/2014 | Kataoka | H01R 43/0207 228/111 |
| 2016/0064885 | A1 | * | 3/2016 | Matsuoka | H01R 43/0207 29/879 |
| 2017/0341144 | A1 | * | 11/2017 | Pelaprat | B23K 26/082 |
| 2018/0169795 | A1 | * | 6/2018 | Bolek | B23K 31/125 |

FOREIGN PATENT DOCUMENTS

| | | |
|---|---|---|
| JP | 2004179484 A | 6/2004 |
| JP | 2007305314 A | 11/2007 |
| JP | 2010044887 A | 2/2010 |
| JP | 2010113946 A | 5/2010 |
| JP | 2011014437 A | 1/2011 |
| JP | 2013004346 A | 1/2013 |
| JP | 2013004406 A | 1/2013 |
| JP | 2014097526 A | 5/2014 |
| JP | 2015022880 A | 2/2015 |
| JP | 2016001590 A | 1/2016 |

OTHER PUBLICATIONS

English translation of International Preliminary Report on Patentability for Application No. PCT/JP2018/022056, dated Dec. 24, 2019.
English translation for Decision of Refusal for JP Application No. 2017070749, dated Sep. 30, 2019.
English Translation of Notice of Reasons for Refusal for JP Application No. 2016-043976, dated Jul. 16, 2019.
English translation of Notice of Reasons for Refusal for JP Application No. 2016-043976, dated Nov. 5, 2019.
English translation of Notice of Reasons for Refusal for JP Application No. 2017-070749, dated May 8, 2019.
International Search Report and Written Opinion (English translation of ISR only) for Application No. PCT/JP2018/022056, dated Jul. 17, 2018.
Partial Supplementary European Search Report in EP Application No. 18819724.8, dated Dec. 2, 2020.
Extended European Search Report for EP Application No. 18819724.8, dated Mar. 5, 2021.

* cited by examiner

ELECTRIC WIRE CONNECTION STRUCTURE

CROSS REFERENCE TO RELATED APPLICATIONS

This is a continuation application of International Patent Application No. PCT/JP2018/022056 filed Jun. 8, 2018, which claims the benefit of Japanese Patent Application No. 2017-121107 filed Jun. 21, 2017, and the full contents of all of which are hereby incorporated by reference in their entirety.

BACKGROUND

Technical Field

The present disclosure provides an electric wire connection structure having an ultrasonic joint part formed by a copper-based conductor exposed part and an aluminum-based conductor exposed part.

Description of the Related Art

As an electric wire connection structure formed by interconnecting electric wires to each other for electrical connection, there is a wire harness being routed in an automobile, for example, for power supply and signal transmission. Some wire harnesses are quite long, and when power is fed to each device from one power source, for example, if wiring from one power source is provided on a one-by-one basis, the number of wires increases to cause an increase in weight. Therefore, an electric wire routed is usually formed by one thick wire in a part from a connecting position with a power source to a position close to (a position in front of) each device and is branched to plural thin wires using a joint in the vicinity of each device from the viewpoint of weight reduction. Further, it is useful to use an aluminum-based material having a light weight as a conductor forming an electric wire instead of a copper-based material.

As a joining method, a so-called resistant welding method in which a part to be welded is sandwiched by two electrodes, current is supplied thereto, and metals are joined to each other heat generated by electric resistance and pressurizing force may be used, for example.

The resistant welding method can relatively easily form a sound joint part when conductor metals of electric wires to be joined are both copper-based materials. However, in a case where metals of different kinds like an Al-based conductor and a Cu-based conductor, for example, are joined with each other, a sound joint part cannot be formed, because only the Al conductor having a lower melting point melts and the Cu conductor having a higher melting point does not melt. Therefore, in order to join metals of different kinds with different melting points by the resistant welding method, the metals should be heated to a high temperature not less than any of melting points of respective metals to be joined in a short time, and joining conditions are difficult to be controlled. In addition, there is a problem in safety because of the high temperature heating.

Therefore, an ultrasonic joining method capable of joining at normal temperature is usually used for joining different kinds of metals with each other. For example, Japanese Patent Application Publication No. 2010-44887 describes a wire harness in which strands forming a conductor of an insulated electric wire are joined with each other and a strand and a metal sleeve (or metal foil, etc.) are joined.

In addition, a case where a copper-based conductor and an aluminum-based conductor are directly ultrasonically joined in a state of being superposed without using a metal sleeve is also supposed from the viewpoint of reducing the number of parts forming a wire harness.

However, when a copper-based conductor and an aluminum-based conductor are superposed and ultrasonically joined, depending on a combination of conductor materials different from one other for the copper-based conductor and the aluminum-based conductor or according to change of joining conditions or the like, a defect part (a space) at which the conductors are not joined (not in contact) may become prone to be present at a joint interface between the copper-based conductor and the aluminum-based conductor forming an ultrasonic joint part. In such a case, there is a problem that a part of the aluminum-based conductor is anodically dissolved due to crevice corrosion, and an increase in electric resistance and a decrease in joining strength (pull-out strength) are easily caused.

SUMMARY

The present disclosure is related to providing an electric wire connection structure in which an increase in electric resistance and a decrease in joining strength (pull-out strength) caused by crevice corrosion are effectively suppressed.

According to an aspect of the present disclosure, an electric wire connection structure includes one or more copper-based conductor covered electric wires having a copper-based conductor covered part in which a copper-based conductor made of copper or a copper alloy is covered with an insulating cover and a copper-based conductor exposed part in which a part of the insulating cover is stripped by a predetermined length to expose the copper-based conductor; and one or more aluminum-based conductor covered electric wires having an aluminum-based conductor covered part in which an aluminum-based conductor made of aluminum or an aluminum alloy is covered with an insulating cover and an aluminum-based conductor exposed part in which a part of the insulating cover is stripped by a predetermined length to expose the aluminum-based conductor. The electric wire connection structure includes a joint part provided at a conductor stacked part in which the copper-based conductor exposed part and the aluminum-based conductor exposed part are superposed. In the electric wire connection structure, a joint interface of the joint part is provided by the aluminum-based conductor covered electric wire being melted so as to fill a gap of the copper-based conductor covered electric wire based on cross-section observation.

According to another aspect of the present disclosure, an electric wire connection structure includes one or more copper-based conductor covered electric wires having a copper-based conductor covered part in which a copper-based conductor made of copper or a copper alloy is covered with an insulating cover and a copper-based conductor exposed part in which a part of the insulating cover is stripped by a predetermined length to expose the copper-based conductor; and one or more aluminum-based conductor covered electric wires having an aluminum-based conductor covered part in which an aluminum-based conductor made of aluminum or an aluminum alloy is covered with an insulating cover and an aluminum-based conductor exposed part in which a part of the insulating cover is stripped by a predetermined length to expose the aluminum-based conductor. The electric wire connection structure includes an ultrasonic joint part provided at a conductor stacked part in which the copper-based conductor exposed part and the aluminum-based conductor exposed part are superposed. In the electric wire connection structure, a joint interface of the ultrasonic joint part satisfies a relational expression of $(x/L) \times 100 \leq 10\%$ where a total contacting length which is a summed length of a part at which the copper-based conductor exposed part and the aluminum-based conductor exposed part contact is L and a summed length of a contour line of a space formed at a part at which the copper-based conductor exposed part and the aluminum-based conductor exposed part are separate is x based on cross-section observation.

Further, it is preferable that a difference in tensile strength between the copper-based conductor and the aluminum-based conductor is 100 MPa or more.

Further, it is preferable that the electric wire connection structure further includes a joint tube in which an ultrasonic joint part is provided at an outer peripheral side of the conductor stacked part.

The present disclosure provides an electric wire connection structure in which an increase in electric resistance and a decrease in joining strength (pull-out strength) caused by crevice corrosion are effectively suppressed.

DETAILED DESCRIPTION

Figure 1:
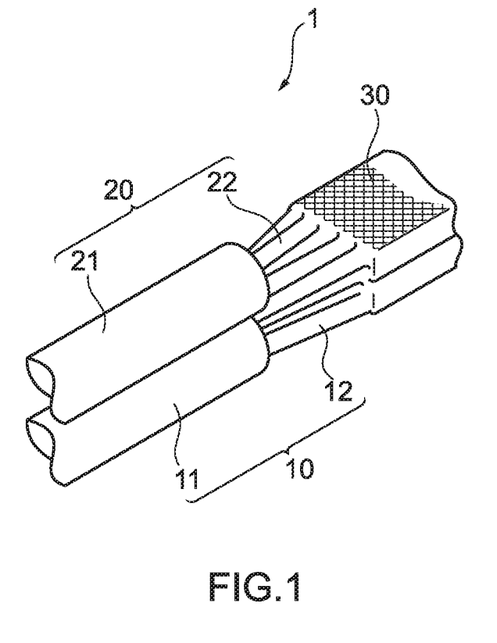
FIG. 1 is a perspective diagram of an electric wire connection structure of one embodiment according to the present disclosure.

Hereinafter, embodiments according to the present disclosure will be described with reference to drawings below. FIG. 1 is a perspective diagram of an electric wire connection structure of one embodiment according to the present disclosure. The shown electric wire connection structure 1 includes one or more copper-based conductor covered electric wires 10 having a copper-based conductor covered part 11 and a copper-based conductor exposed part 12 and one or more aluminum-based conductor covered electric wires 20 having an aluminum-based conductor covered part 21 and an aluminum-based conductor exposed part 22. In addition, the electric wire connection structure 1 has an ultrasonic joint part 30 provided at a conductor stacked part in which the copper-based conductor exposed part 12 and the aluminum-based conductor exposed part 22 are superposed.

(Electric Wire Connection Structure)

According to an aspect of the present disclosure, the electric wire connection structure 1 includes one or more copper-based conductor covered electric wires 10 having the copper-based conductor covered part 11 in which a copper-based conductor made of copper or a copper alloy is covered with an insulating cover and the copper-based conductor exposed part 12 in which a part of the insulating cover is stripped by a predetermined length to expose the copper-based conductor; and one or more aluminum-based conductor covered electric wires 20 having the aluminum-based conductor covered part 21 in which an aluminum-based conductor made of aluminum or an aluminum alloy is covered with an insulating cover and the aluminum-based conductor exposed part 22 in which a part of the insulating cover is stripped by a predetermined length to expose the aluminum-based conductor, and the electric wire connection structure 1 includes a joint part provided at a conductor stacked part in which the copper-based conductor exposed part and the aluminum-based conductor exposed part are superposed, with a joint interface of the joint part being provided by the aluminum-based conductor covered electric wire being melted so as to fill a gap of the copper-based conductor covered electric wire based on cross-section observation.

According to another aspect of the present disclosure, the electric wire connection structure 1 includes one or more copper-based conductor covered electric wires 10 having the copper-based conductor covered part 11 in which a copper-based conductor made of copper or a copper alloy is covered with an insulating cover and the copper-based conductor exposed part 12 in which a part of the insulating cover is stripped by a predetermined length to expose the copper-based conductor; and one or more aluminum-based conductor covered electric wires 20 having the aluminum-based conductor covered part 21 in which an aluminum-based conductor made of aluminum or an aluminum alloy is covered with an insulating cover and the aluminum-based conductor exposed part 22 in which a part of the insulating cover is stripped by a predetermined length to expose the aluminum-based conductor, and the electric wire connection structure 1 includes an ultrasonic joint part provided at a conductor stacked part in which the copper-based conductor exposed part and the aluminum-based conductor exposed part are superposed, with a joint interface of the ultrasonic joint part satisfying a relational expression of $(x/L) \times 100 \leq 10\%$ where a total contacting length which is a summed length of a part at which the copper-based conductor exposed part and the aluminum-based conductor exposed part contact is L and a summed length of a contour line of a space formed at a part at which the copper-based conductor exposed part and the aluminum-based conductor exposed part are separate is x based on cross-section observation. Each element forming the electric wire connection structure 1 is as follows, and the electric wire connection structure 1 like this can effectively suppress an increase in electric resistance and a decrease in joining strength (pull-out strength) caused by crevice corrosion.

(Copper-Based Conductor Covered Electric Wire)

The copper-based conductor covered electric wire 10 used in the present disclosure has the copper-based conductor covered part 11 in which a copper-based conductor made of copper or a copper alloy is covered with an insulating cover and the copper-based conductor exposed part 12 in which a part of the insulating cover is stripped by a predetermined length to expose the copper-based conductor. The copper-based conductor covered electric wire 10 may be one covered electric wire in which a copper-based conductor formed by bundling plural strands made of a copper-based material is covered with an insulating cover or may be plural covered electric wires formed by bundling such covered electric wires, for example. In addition, while it is preferable that the copper-based conductor is formed by twisting strands to have a predetermined cross-sectional area, the copper-based conductor is not limited to this form and may be formed by a single wire. A strand diameter and the number of strands forming the copper-based conductor are not particularly limited, but it is preferable that the diameter of a strand is within a range of 0.05 to 1 mm and the number of strands is within a range of 7 to 90, for example.

The copper-based conductor is not particularly limited, but pure copper such as tough pitch copper, oxygen-free copper, and phosphorous-deoxidized copper, brass, phosphor bronze, a corson-type copper alloy (Cu—Ni—Si-based alloy), and the like may be used, for example.

As such copper or a copper alloy, pure copper of alloy number C1000 series, a Cu—Zn-based alloy of alloy number C2000 series, a Cu—Sn-based alloy of alloy number C5000 series, and a Cu—Al-based alloy of alloy number C6000 series according to the standard of JIS H 3100:2012 can be used, for example.

The insulating cover is not particularly limited as long as it is a material having insulation properties, but a halogen-based resin containing polyvinyl chloride, crosslinked polyvinyl chloride, chloroprene rubber, or the like as a main component or a halogen-free resin containing polyethylene, crosslinked polyethylene, ethylene propylene rubber, silicone rubber, polyester, or the like as a main component, and the like can be used as a resin material forming the insulating cover, for example, and a polyvinyl chloride resin is especially used. In addition, an additive such as a plasticizer, a flame retardant, and the like may be included in these resin materials as needed.

The copper-based conductor covered part 11 represents a part of the copper-based conductor where the copper-based conductor is not exposed and covered with the insulating cover in the copper-based conductor covered electric wire 10 in which the copper-based conductor is covered with the insulating cover. The copper-based conductor covered part 11 is a part of the original copper-based conductor free from an influence from ultrasonic waves described later.

The copper-based conductor exposed part 12 represents a part where the copper-based conductor is exposed by stripping a part of the insulating cover by a predetermined length. The copper-based conductor exposed part 12 is a part of the copper-based conductor to which ultrasonic waves are applied as described later, and forms the ultrasonic joint part 30 together with the aluminum-based conductor exposed part 22 responding to ultrasonic waves. The length of the insulating cover to be stripped is not particularly limited as long as the copper-based conductor exposed part 12 has a length enough to be ultrasonically joined with the aluminum-based conductor exposed part 22, and the length of the insulating cover to be stripped can be appropriately set according to the range of a region to be joined with the corresponding aluminum-based conductor exposed part 22. The length of the copper-based conductor exposed part 12, that is, the length of the insulating cover to be stripped is preferably 5 to 25 mm and more preferably 10 to 20 mm, for example.

(Aluminum-Based Conductor Covered Electric Wire)

The aluminum-based covered electric wire 20 used in the present disclosure has the aluminum-based conductor covered part 21 in which an aluminum-based conductor is covered with an insulating cover and the aluminum-based conductor exposed part 22 in which a part of the insulating cover is stripped by a predetermined length to expose the aluminum-based conductor. The aluminum-based covered electric wire 20 may be one covered electric wire in which an aluminum-based conductor formed by bundling plural strands made of an aluminum-based material is covered with an insulating cover or may be plural covered electric wires formed by bundling such covered electric wires, for example. In addition, while it is preferable that the aluminum-based conductor is formed by twisting strands to have a predetermined cross-sectional area, the aluminum-based conductor is not limited to this form and may be formed by a single wire. A strand diameter and the number of strands forming the aluminum-based conductor are not particularly limited, but it is preferable that the diameter of a strand is within a range of 0.05 to 1 mm and the number of strands is within a range of 7 to 90, for example.

The aluminum-based conductor is not particularly limited, but pure aluminum (Al) and aluminum alloys such as an aluminum-manganese-based alloy (Al—Mn-based alloy), an aluminum-magnesium-based alloy (Al—Mg-based alloy), an aluminum-magnesium-silicon-based alloy (Al—Mg—Si-based alloy), an aluminum-zinc-magnesium-based alloy (Al—Zn—Mg-based alloy), and an aluminum-copper-magnesium-based alloy (Al—Cu—Mg alloy) can be used, for example. An aluminum alloy is preferable from the viewpoint of imparting higher strength.

As such aluminum or an aluminum alloy, pure aluminum of alloy number 1050, 1060, 1070, 1100, or 1200, an Al—Mn-based alloy of alloy number 3003 or 3203, an Al—Mg-based alloy of alloy number 5052, 5454, 5083, or 5086, an Al—Mg—Si-based alloy of alloy number 6101, 6N01, 6005A, 6060, 6061, 6063, or 6082, an Al—Zn—Mg-based alloy of alloy number 7003, 7N01, 7005, 7020, 7050, or 7075, and an Al—Cu—Mg alloy of alloy number 2014, 2014A, 2017, 2017A, or 2024 according to the standard of JIS H 4100:2015 can be used, for example.

The insulating cover is not particularly limited as long as it is a material having insulation properties, but a halogen-based resin containing polyvinyl chloride, crosslinked polyvinyl chloride, chloroprene rubber, or the like as a main component or a halogen-free resin containing polyethylene, crosslinked polyethylene, ethylene propylene rubber, silicone rubber, polyester, or the like as a main component, and the like can be used as a resin material forming the insulating cover, for example, and a polyvinyl chloride resin is especially used. In addition, an additive such as a plasticizer, a flame retardant, and the like may be included in these resin materials as needed.

The aluminum-based conductor covered part 21 represents a part of the aluminum-based conductor where the aluminum-based conductor is not exposed and covered with the insulating cover in the covered electric wire 1 in which the aluminum-based conductor is covered with the insulating cover. The aluminum-based conductor covered part 21 is a part of the original aluminum-based conductor free from an influence from ultrasonic waves described later.

The aluminum-based conductor exposed part 22 represents a part where the aluminum-based conductor is exposed by stripping a part of the insulating cover by a predetermined length. The aluminum-based conductor exposed part 22 is a part of the aluminum-based conductor to which ultrasonic waves are applied as described later, and forms the ultrasonic joint part 30 together with the copper-based conductor exposed part 12 responding to ultrasonic waves. The length of the insulating cover to be stripped is not particularly limited as long as the aluminum-based conductor exposed part 22 has a length enough to be joined with the copper-based conductor exposed part 12, and the length of the insulating cover to be stripped can be appropriately set according to the range of a region to be joined with the corresponding copper-based conductor exposed part 12. The length of the aluminum-based conductor exposed part 22, that is, the length of the insulating cover to be stripped is preferably 5 to 25 mm and more preferably 10 to 20 mm, for example.

(Ultrasonic Joint Part)

Figure 2:
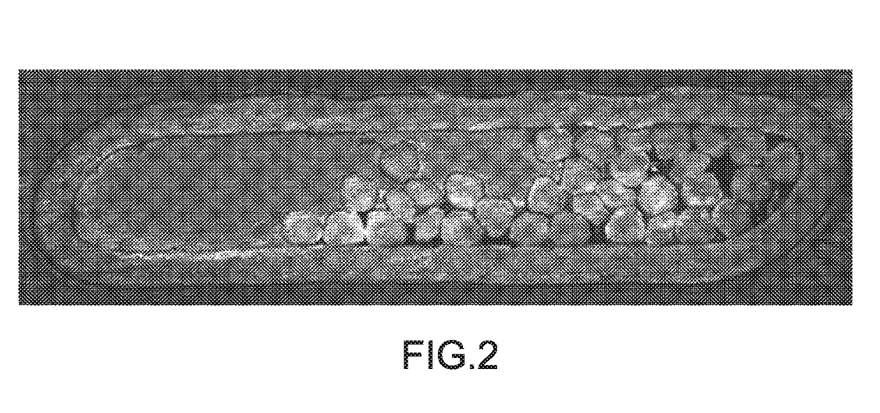
FIG. 2 is a sectional photograph of an ultrasonic joint part forming an electric wire connection structure of another embodiment according to the present disclosure.

The electric wire connection structure 10 of the present disclosure has the ultrasonic joint part 30 formed by the copper-based conductor exposed part 12 and the aluminum-based conductor exposed part 22. In addition, the ultrasonic joint part 30 can be integrally formed by further including a joint tube 50 at an outer peripheral side of the conductor stacked part at which the copper-based conductor exposed part 12 and the aluminum-based conductor exposed part 22 are superposed. FIG. 2 shows a sectional photograph of an electric wire connection structure having an ultrasonic joint part 30 provided with a joint tube 50 at the outer peripheral side of the conductor stacked part.

Then, a major constitutional feature of the present disclosure is to optimize characteristics of the joint interface of the ultrasonic joint part 30 provided by ultrasonic joining, and in particular to satisfy the relational expression of $(x/L) \times 100 \leq 10\%$ where a total contacting length which is a summed length of a part at which the copper-based conductor exposed part 12 and the aluminum-based conductor exposed part 22 contact (join) is L and a summed length of a contour line of a space S formed at a part at which the copper-based conductor exposed part 12 and the aluminum-based conductor exposed part 22 are separate is x based on cross-section observation of the ultrasonic joint part 30, and an increase in electric resistance and a decrease in joining strength (tensile strength) caused by crevice corrosion are effectively suppressed thereby.

Here, the reason why the total contacting length L and the summed length x of the contour line of the space are made to satisfy the relational expression of $(x/L) \times 100 \leq 10\%$ is that when a value of $(x/L) \times 100$ is larger than 10%, the part which is present at the joint interface of the ultrasonic joint part 30 and at which the copper-based conductor exposed part 12 and the aluminum-based conductor exposed part 22 are separate increases, the space which causes generation of crevice corrosion increases in its number or volume, and an increase in electric resistance and a decrease in joining strength (pull-out strength) become remarkable.

Figure 3:
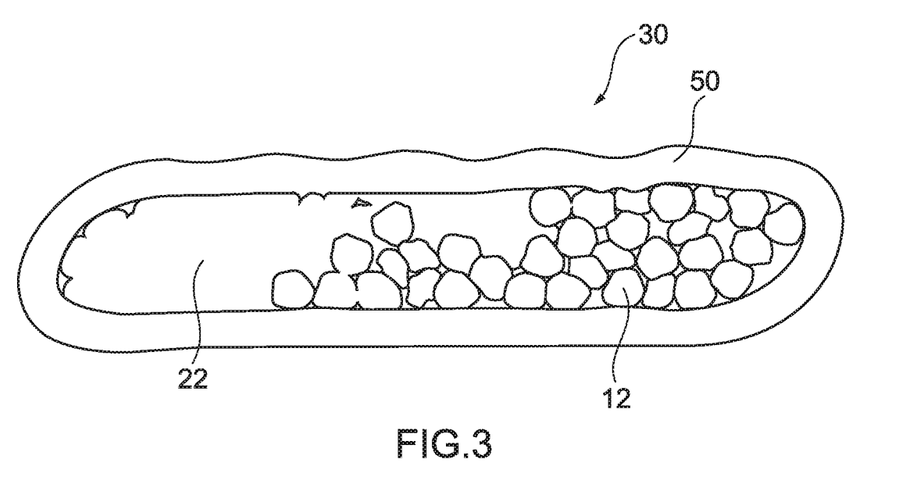
FIG. 3 is a diagram diagrammatically illustrating the ultrasonic joint part of FIG. 2.
Figure 4:
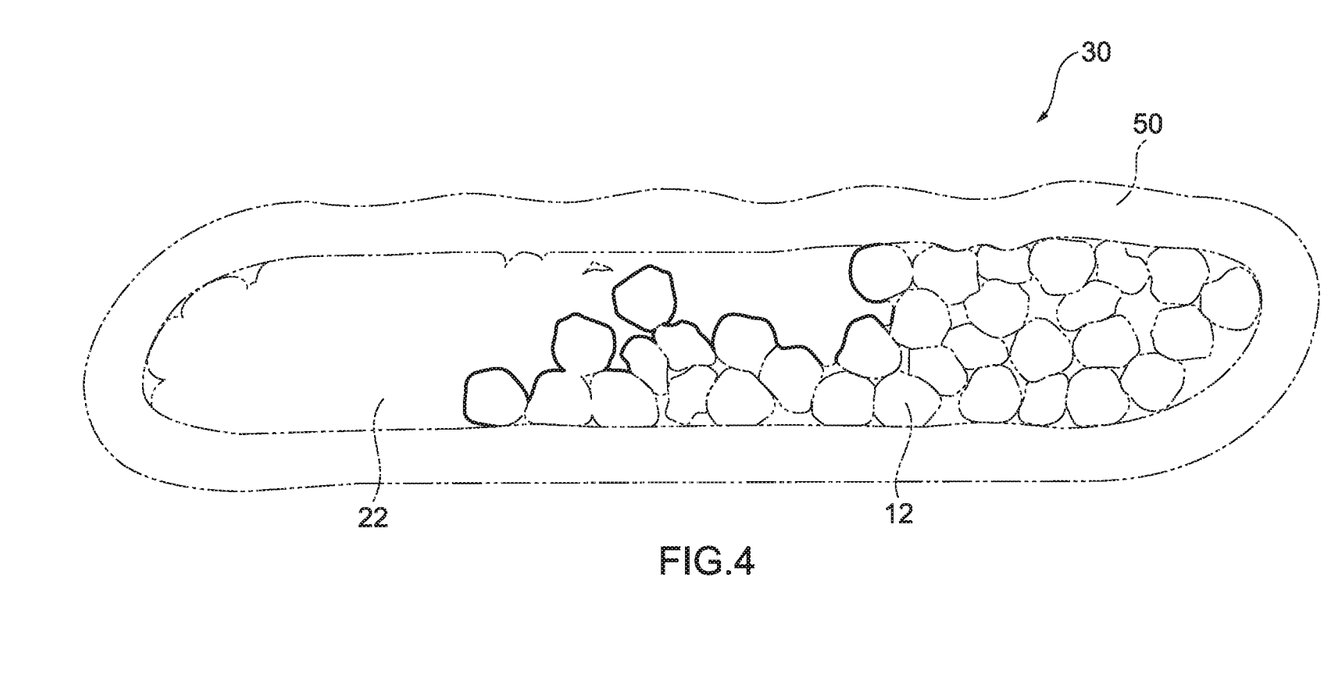
FIG. 4 is a diagram illustrating with solid lines a part which is present at a joint interface between an aluminum-based conductor exposed part and a copper-based conductor exposed part forming the ultrasonic joint part of FIG. 3 and at which both exposed parts contact (join).
Figure 5:
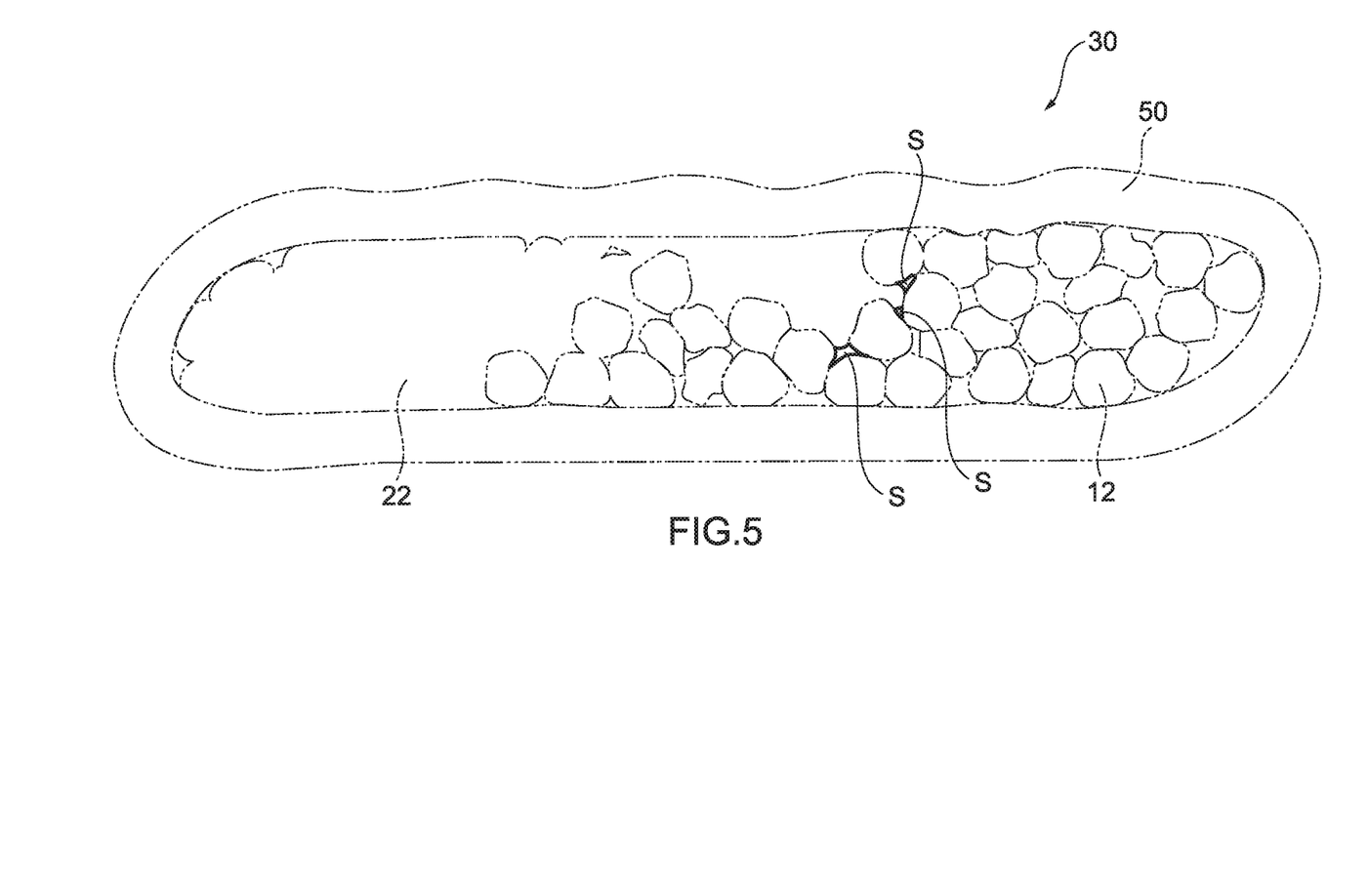
FIG. 5 is a diagram illustrating with solid lines spaces which are present at the joint interface between the aluminum-based conductor exposed part and the copper-based conductor exposed part forming the ultrasonic joint part of FIG. 3 and which are formed at a part at which the exposed parts are separate.
Figure 6:
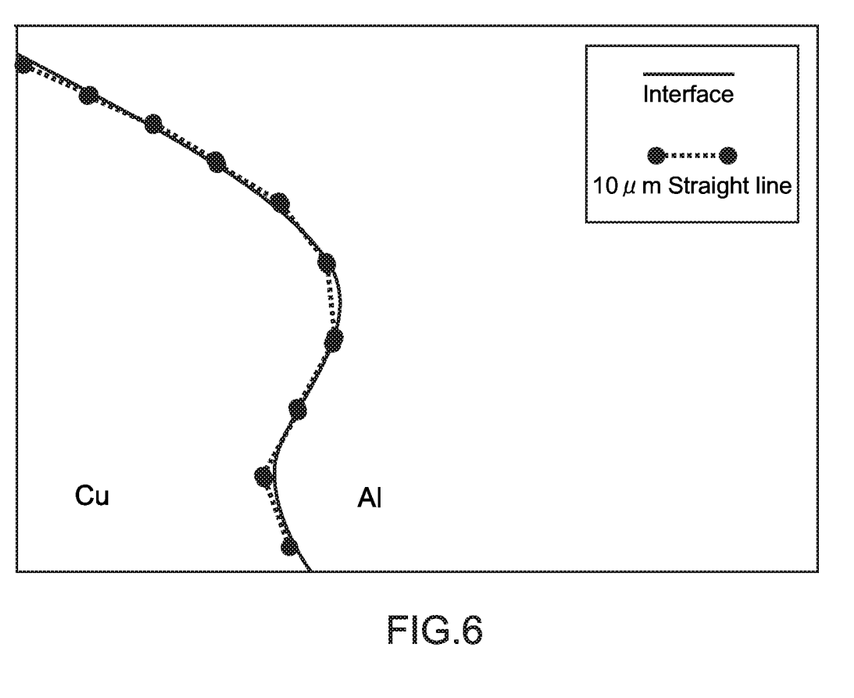
FIG. 6 is a diagram for describing a measurement method of a total contacting length L of the contacting part shown in FIG. 4 and a sum x of contour line lengths of the spaces shown in FIG. 5.

FIG. 3 is a diagram diagrammatically illustrating the ultrasonic joint part of FIG. 2, FIG. 4 is an enlarged diagram illustrating the ultrasonic joint part of FIG. 3 with dashed-two dotted lines and representing with solid lines the part which is present at the joint interface between the aluminum-based conductor exposed part and the copper-based conductor exposed part and at which both exposed parts contact (join), FIG. 5 is an enlarged diagram illustrating the ultrasonic joint part of FIG. 3 with dashed-two dotted lines and representing with solid lines spaces S (three spaces in FIG. 5) which are present at the joint interface between the aluminum-based conductor exposed part and the copper-based conductor exposed part and which are formed at the part at which the exposed parts are separate from each other, and FIG. 6 is a diagram for describing a measurement method of the total contacting length L of the contacting part shown in FIG. 4 and the summed length x of the contour lines of the spaces S shown in FIG. 5.

Here, the "total contacting length L" is a summed length of the part which is present at the joint interface between the aluminum-based conductor exposed part 22 and the copper-based conductor exposed part 12 and at which the copper-based conductor exposed part 12 and the aluminum-based conductor exposed part 22 contact (join) based on cross-section observation of the ultrasonic joint part 30, and specifically means the total sum of the lengths of the solid lines shown in FIG. 4.

In addition, the "summed length x of a contour line of a space" is a summed length of a contour line of a space S formed at a part which is present at the joint interface between the aluminum-based conductor exposed part 22 and the copper-based conductor exposed part 12 and at which the copper-based conductor exposed part 12 and the aluminum-based conductor exposed part 22 are separate based on cross-section observation of the ultrasonic joint part 30, and specifically means, when the space S is present at only one location, a contour line length measured for the space S, and when the space S is present at plural locations (three locations in FIG. 5) as shown by the solid lines in FIG. 5, the total sum of the contour lengths measured for spaces S at the respective plural locations.

Incidentally, measurements on the total contacting length L and the summed length x of the contour line of the space were conducted by a method in which a cross-section of the ultrasonic joint part 30 is captured by using an optical microscope or an electron microscope and an extending shape of the joint interface (illustrated by the solid line in FIG. 6) can be approximated as much as possible from the captured image or photograph, for example, by a method in which plural straight lines each having a length of 10 μm or less (for example, 10 μm) are used and connected in a line graph as illustrated in FIG. 6.

In addition, in the electric wire connection structure of the present disclosure, it is preferable that a difference in tensile strength between the copper-based conductor and the aluminum-based conductor is 100 MPa or more. Consequently, a material of one conductor exposed part (for example, the aluminum-based conductor exposed part 22) out of the copper-based conductor exposed part 12 and the aluminum-based conductor exposed part 22 can be made deformable compared with the other conductor exposed part (for example, the copper-based conductor exposed part 12), and therefore, by combining these conductors with each other, resulting configuration allows one conductor exposed part to be relatively significantly collapsed by pressurizing force during ultrasonic joining, and the one conductor exposed part is preferentially plastically deformed or melted in the space S unjoined (not in contact) which is likely to be formed between the copper-based conductor exposed part 12 and the aluminum-based conductor exposed part 22 forming the joint interface to fill the space S (gap). As a result, formation of an ultrasonic joint part having a sound joint interface is made possible, and an increase in electric resistance and a decrease in joining strength (pull-out strength) caused by crevice corrosion can be more effectively suppressed. Incidentally, measurements of tensile strength were conducted three times, and an average value thereof was obtained according to JIS Z 2241.

Incidentally, in the electric wire connection structure of the present disclosure, tensile strength may be higher in the aluminum-based conductor than in the copper-based conductor or may be higher in the copper-based conductor than in the aluminum-based conductor to the contrary as long as the difference in tensile strength between the copper-based conductor and the aluminum-based conductor is 100 MPa or more, and therefore, a combination of the copper-based conductor and the aluminum-based conductor can be appropriately selected according to application.

(Manufacturing Method of Electric Wire Connection Structure)

Next, a manufacturing method of the electric wire connection structure 1 according to the present disclosure will be described. The manufacturing method of the electric wire connection structure 1 in the present disclosure at least includes a step of mainly preparing a copper-based conductor covered electric wire 10 and an aluminum-based conductor covered electric wire 20, a step of forming a copper-based conductor exposed part and an aluminum-based conductor exposed part, and a step of ultrasonically joining the copper-based conductor exposed part and the aluminum-based conductor exposed part to form an ultrasonic joint part.

(Step of Preparing Respective Covered Electric Wires)

First, the copper-based conductor covered electric wire 10 having a copper-based conductor covered part 11 in which a copper-based conductor is covered with an insulating cover and an aluminum-based conductor covered electric wire 20 having an aluminum-based conductor covered part 21 in which an aluminum-based conductor is covered with an insulating cover are prepared. For the copper-based conductor and the insulating cover forming the copper-based conductor covered electric wire 10 and for the aluminum-based conductor and the insulating cover forming the aluminum-based conductor covered electric wire 20, the materials described above can be respectively used, and it is preferable that the insulating cover is a polyvinyl chloride resin. In addition, the copper-based conductor is not particularly limited, but a copper-based conductor formed by twisting and bundling plural strands made of a copper-based material is preferable. For example, a copper-based conductor formed by twisting and bundling seven copper-based strands and having a size (thickness) of 0.13 sq (0.13 mm$^2$) can be used. In addition, the aluminum-based conductor is not particularly limited, but an aluminum-based conductor formed by twisting and bundling plural strands made of an aluminum-based material is preferable. For example, an aluminum-based conductor formed by twisting and bundling seven aluminum-based strands and having a size (thickness) of 0.75 sq (0.75 mm$^2$) can be used.

(Step of Forming Each Conductor Exposed Part)

Thereafter, the copper-based conductor covered electric wire and the aluminum-based conductor covered electric wire respectively form a copper-based conductor exposed part 12 and an aluminum-based conductor exposed part 22 each of which is exposed by stripping a part of the insulating cover in a predetermined length. A method for stripping the insulating cover is not particularly limited, but a tool or an instrument such as a wire stripper can be used, for example. The length of the insulating cover to be stripped in each of the covered electric wires 10 and 20 is appropriately designed according to the range of a region of each of the conductor exposed parts 12 and 22 to be ultrasonically joined, and the length of the insulating cover to be stripped is preferably 5 to 25 mm and more preferably 10 to 25 mm, for example.

(Step of Forming Ultrasonic Joint Part)

Further, the ultrasonic joint part 30 is formed by ultrasonically joining the formed copper-based conductor exposed part 12 and aluminum-based conductor exposed part 22 in a state of being superposed. In addition, the ultrasonic joint part 30 may be formed by inserting an outer peripheral side of a conductor stacked part in which the copper-based conductor exposed part 12 and the aluminum-based conductor exposed part 22 are superposed to the inside of a joint tube 50 and subsequently ultrasonically joining these while applying pressure from an outer surface side of the joint tube 50.

Incidentally, superposition of the copper-based conductor exposed part 12 and the aluminum-based conductor exposed part 22 may be achieved by preliminarily joining a bundle of strands forming the copper-based conductor exposed part 12 and a bundle of strands forming the aluminum-based conductor exposed part 22 and superposing the joined conductor exposed parts 12 and 22 with each other.

The ultrasonic joining is conducted by applying parallel ultrasonic vibration to a joint surface 33 between the copper-based conductor exposed part 12 and the aluminum-based conductor exposed part 22 while applying pressurizing force in a vertical direction in a state in which the copper-based conductor exposed part 12 and the aluminum-based conductor exposed part 22 are superposed. Generally, aluminum is known to form a tough oxide coating on its surface once being exposed to oxygen in the air. In addition, dirt derived from a substance such as oil or dust adheres to a metal surface in some cases. Interfaces between the copper-based conductor exposed part 12 and the aluminum-based conductor exposed part 22 rub against each other by friction caused by ultrasonic vibration to remove an oxide coating and an adhered substance on the joint surface 33, and activated metal molecules appear on a clean joint surface. On further applying ultrasonic vibration, motion of metal atoms becomes active due to heating with frictional heat to cause movement of metal atoms caused by diffusion. Thereafter, strong attracting force is mutually generated between the metal parts, and copper-based metal in the copper-based conductor exposed part 12 and aluminum-based metal in the aluminum-based conductor exposed part 22 are joined in a solid state.

Since copper-based metal in the copper-based conductor exposed part 12 and aluminum-based metal in the aluminum-based conductor exposed part 22 are joined in a solid state, temperature rises not so high as to cause both metals to melt, and such ultrasonic joining can be conducted at a relatively low temperature (usually, about 35 to 50% of melting points of mother materials). Meanwhile, when parallel ultrasonic vibration is applied to the joint surface 33 between the copper-based conductor exposed part 12 and the aluminum-based conductor exposed part 22, microscopic shear deformation due to ultrasonic vibration is generated, and consequently, the ultrasonic joint part 30 formed by the copper-based conductor exposed part 12 and the aluminum-based conductor exposed part 22 is formed.

Figure 7:
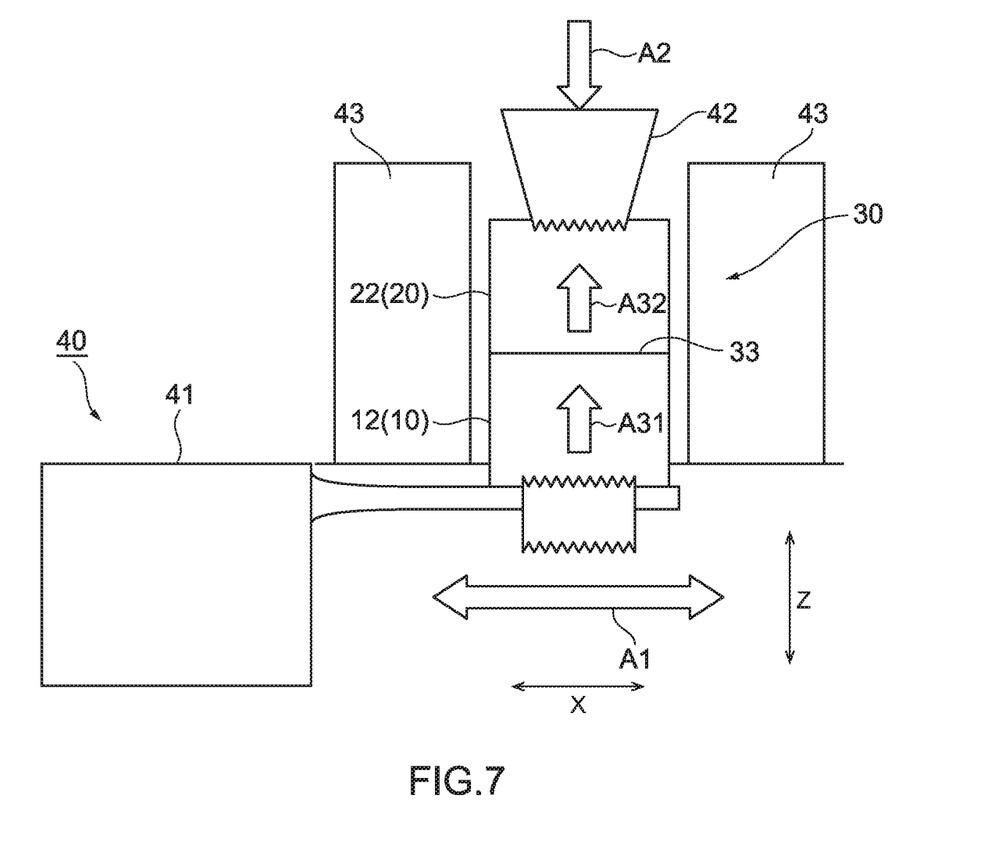
FIG. 7 is a schematic diagram for describing steps for superposing and ultrasonically joining a copper-based conductor exposed part and an aluminum-based conductor exposed part using an ultrasonic joining apparatus.

FIG. 7 is a schematic diagram for describing steps of superposing the copper-based conductor covered electric wire 10 and the aluminum-based conductor covered electric wire 22 and subsequently ultrasonically joining an interface of the copper-based conductor exposed part 22 and the aluminum-based conductor exposed part 12 in that state using an ultrasonic joining apparatus 40 to form the ultrasonic joint part 30 having the joint surface 33.

As illustrated in FIG. 7, for example, shape retention by the ultrasonic joining apparatus 40 is performed by placing the copper-based conductor exposed part 12 and the aluminum-based conductor exposed part 22 in a state of being superposed between a pressurizing surface of a horn 41 and a pressurizing surface of an anvil 42, clipping the superposed copper-based conductor exposed part 12 and aluminum-based conductor exposed part 22 with the horn 41 and the anvil 42 from a vertical direction, and disposing work holding jigs (grinding jaws) 43 at both right and left sides so that the superposed state does not collapse. Thereafter, the ultrasonic joining apparatus 40 can conduct ultrasonic joining by allowing the horn 41 to oscillate ultrasonic vibration oscillating in a longitudinal direction X (arrow A1 in FIG. 7) while applying pressure to press in a pressurizing direction Z (arrow A2 in FIG. 7) with the anvil 42. Energy of the ultrasonic waves to be applied is not particularly limited but is preferably 100 to 800 Ws (J) and more preferably 200 to 700 Ws. In addition, a compression rate of the ultrasonic joint part is preferably in a range of 20 to 80%. Incidentally, the "compression rate" herein means a value obtained by dividing a decreased amount from a cross-sectional area before crimping by the cross-sectional area before crimping and multiplying it by 100.

As the ultrasonic joining apparatus 40 operates in this way, the ultrasonic vibration oscillated from the horn 41 propagates through the inside of one conductor exposed part (the copper-based conductor exposed part 12 in FIG. 7) in the pressurizing direction Z (arrow A31 in FIG. 7) and consequently propagates through the inside of the other conductor exposed part (the aluminum-based conductor exposed part 22 in FIG. 7) in the pressurizing direction Z (arrow A32 in FIG. 7) from the copper-based conductor exposed part 12 via an interface to be the joint surface 33 to form the joint surface 33 around the interface. As a result, the ultrasonic joint part 30 is formed. At this time, the joint interface of the ultrasonic joint part can effectively suppress an increase in electric resistance and a decrease in joining strength (pull-out strength) caused by crevice corrosion by a total contacting length L and a summed length x of a contour line of a space S satisfying the relational expression of $(x/L) \times 100 \leq 10\%$.

Incidentally, the embodiments described above only exemplify several exemplary embodiments of the present disclosure, and various modifications can be made within the scope of the present disclosure.

EXAMPLES

The present disclosure will be described in more detail based on the following examples, but the present disclosure is not limited to these examples.

Examples 1 to 10 and Comparative Examples 1 to 5

A copper-based conductor covered electric wire 10 and an aluminum-based conductor covered electric wire 20 were prepared by covering a copper-based conductor having the composition, tensile strength, and the like shown in Table 1 with an insulating cover of polyvinyl chloride and by covering an aluminum-based conductor having the composition, tensile strength, and the like shown in Table 1 with an insulating cover of polyvinyl chloride, respectively. Thereafter, the tip side of each of the covered electric wires 10, 20 was stripped by about 1.5 cm by a wire stripper to form a copper-based conductor exposed part 12 in which the copper-based conductor was exposed and an aluminum-based conductor exposed part 22 in which the aluminum-based conductor was exposed. The copper-based conductor exposed part 12 of the copper-based conductor covered electric wire 10 and the aluminum-based conductor exposed part 22 of the aluminum-based conductor covered electric wire 20 thus formed were superposed and subsequently placed on a pedestal (horn side) of an ultrasonic joining apparatus (manufactured by Schunk GmbH) in a state of being superposed. Incidentally, with respect to Examples 1 to 3, the copper-based conductor exposed part 12 and the aluminum-based conductor exposed part 22 were placed on the pedestal (horn side) of the ultrasonic joining apparatus with a joint tube disposed at an outer peripheral side of the conductor stacked part in which the copper-based conductor exposed part 12 and the aluminum-based conductor exposed part 22 of the aluminum-based conductor covered electric wire 20 were superposed. Thereafter, ultrasonic waves were applied to the outer surface of the placed conductor stacked part or the outer surface of the joint tube in a state of being sandwiched by the horn and the anvil under the joining conditions shown in Table 1 while applying pressurizing force in the vertical direction to form an ultrasonic joint part integrated by ultrasonic joining. A corrosion test was conducted on each of the ultrasonic joint part thus obtained, electric resistance and pull-out strength were measured before and after the corrosion test, an increasing ratio of electric resistance and a decreasing ratio of pull-out strength after the corrosion test were calculated, and corrosion resistance was comprehensively evaluated from these calculated values.

(Evaluation Method)

<Measurements of Total Contacting Length L and Summed Length of Contour Line of Space>

A total contacting length L and a summed length of a contour line of a space were measured by a method in which a cross-section of the ultrasonic joint part 30 is captured by using an optical microscope or an electron microscope and an extending shape of the joint interface (illustrated by the solid line in FIG. 6) can be approximated as much as possible from the captured image or photograph, for example, by a method in which plural straight lines each having a length of 10 μm or less (for example, 10 μm) are used and connected in a line graph as illustrated in FIG. 6.

<Corrosion Test>

Corrosion tests were conducted by methods of salt spray testing specified in JIS Z2371:2015. Test conditions are as follows.

[Test Conditions]

Test piece size: 200 mm (ultrasonic joint part+electric wire)

Salt solution: neutral salt water

Test temperature: 35° C.

pH: 7

Pressure of compressed air: 0.1 MPa

Test time: 96 h

<Measurement of Electric Resistance>

With respect to a test piece before being subjected to the above corrosion test and a test piece after being subjected to the above corrosion test, the copper-based conductor of the copper-based conductor covered electric wire was attached to one electrode and the aluminum-based conductor of the aluminum-based conductor covered electric wire was attached to another electrode, and electric resistance was measured using a circuit element measuring device manufactured by HIOKI E.E. CORPORATION (product name: 3560 AC mΩ HiTESTER) to obtain a ratio (increasing ratio (%)) of the electric resistance of the test piece after the corrosion test increased compared with the electric resistance of the test piece before the corrosion test.

<Measurement of Pull-Out Strength>

With respect to a test piece before being subjected to the above corrosion test and a test piece after being subjected to the above corrosion test, the ultrasonic joint part and an electric wire part were fixed to a chuck, and pull-out strength was measured. A ratio (decreasing ratio (%)) of the pull-out strength of the test piece after the corrosion test decreased compared with the pull-out strength of the test piece before the corrosion test was obtained.

These evaluation results are shown in Table 2.

<Comprehensive Evaluation>

Comprehensive evaluation was performed considering the results of the increasing ratio of electric resistance and the decreasing ratio of pull-out strength obtained after the above corrosion test. In comprehensive evaluation, the case where both of the increasing ratio in the electric resistance value and the decreasing ratio of pull-out strength were less than 10% was rated as "good," the case where both of the increasing ratio in the electric resistance value and the decreasing ratio of pill-out strength were less than 50% and at least one thereof was 10% or more was rated as "fair," the case where at least one of the increasing ratio in the electric resistance value and the decreasing ratio of pull-out strength was 50% or more was rated as "poor," and "good" and "fair" were regarded as acceptable levels in the present examples.

TABLE 1

| | Conditions for manufacturing electric wire connection structure | | | | | | | | | | |
|---|---|---|---|---|---|---|---|---|---|---|---|
| | Conditions before ultrasonic joining | | | | | | | | | Ultrasonic joining conditions | |
| | Cu-based conductor covered electric wire Cu-based conductor | | | | Al-based conductor covered electric wire Al-based conductor | | | | Difference in tensile strength \|T1 − T2\| (MPa) | Presence or absence of arrangement of joint tube | Compression rate (%) | Energy for joining (Ws) |
| | Type | Number of strands | Diameter of strand (mm) | Tensile strength T1 (MPa) | Type | Number of strands | Diameter of strand (mm) | Tensile strength T2 (MPa) | | | | |
| Example 1 | C1100-O | 7 | 0.3 | 232 | A1070-O | 14 | 0.3 | 72 | 160 | Present | 80 | 200 |
| Example 2 | C1100-H | 14 | 0.3 | 365 | A1070-H18 | 14 | 0.3 | 131 | 234 | Present | 60 | 600 |
| Example 3 | C1020-O | 14 | 0.3 | 270 | A1060-O | 11 | 0.1 | 70 | 200 | Present | 50 | 400 |
| Example 4 | C2700-O | 14 | 0.3 | 360 | A2011-T8 | 11 | 0.3 | 414 | 54 | Absent | 50 | 450 |
| Example 5 | C6140-F | 57 | 0.1 | 577 | A6061-T4 | 11 | 0.3 | 240 | 337 | Absent | 40 | 700 |
| Example 6 | C1100-O | 21 | 0.3 | 232 | A6061-T6 | 7 | 0.3 | 320 | 88 | Absent | 40 | 550 |
| Example 7 | C1100-O | 14 | 0.8 | 232 | A6070-T6 | 7 | 0.3 | 388 | 156 | Absent | 40 | 300 |
| Example 8 | C1201-O | 38 | 0.8 | 220 | A1070-O | 7 | 0.3 | 72 | 148 | Absent | 40 | 400 |
| Example 9 | C1100-O | 11 | 0.3 | 232 | A1070-O | 57 | 0.1 | 72 | 160 | Absent | 30 | 200 |
| Example 10 | 0.7Sn-O | 38 | 0.3 | 280 | A1070-O | 21 | 0.8 | 72 | 208 | Absent | 20 | 550 |
| Comparative Example 1 | C1100-O | 7 | 0.3 | 232 | A1070-O | 7 | 0.3 | 72 | 160 | Absent | 40 | 50 |
| Comparative Example 2 | C1100-O | 7 | 0.3 | 232 | A6061-T4 | 7 | 0.3 | 240 | 8 | Absent | 10 | 300 |
| Comparative Example 3 | C1100-O | 7 | 0.3 | 232 | A6041-T4 | 11 | 0.3 | 240 | 8 | Absent | 40 | 300 |
| Comparative Example 4 | C1201-O | 11 | 0.3 | 220 | A6061T-4 | 11 | 0.3 | 240 | 20 | Absent | 90 | 300 |
| Comparative Example 5 | C1100-H | 11 | 0.1 | 365 | | 11 | 0.1 | 388 | 23 | Absent | 40 | 900 |

TABLE 2

| | | | | Evaluation after corrosion test | | |
|---|---|---|---|---|---|---|
| | Total contacting length L (mm) | Contour line Length of space x (mm) | (x/L) × 100 (%) | Increasing ratio of electric resistance (%) | Decreasing ratio of pull-out strength (%) | Comprehensive evaluation |
| Example 1 | 2.64 | 0.04 | 1.42% | 7 | 7 | Good |
| Example 2 | 8.43 | 0.10 | 1.23% | 5 | 4 | Good |
| Example 3 | 4.02 | 0.20 | 5.03% | 12 | 9 | Fair |
| Example 4 | 1.18 | 0.10 | 8.18% | 19 | 15 | Fair |
| Example 5 | 9.37 | 0.10 | 1.08% | 3 | 5 | Good |
| Example 6 | 1.92 | 0.10 | 5.20% | 13 | 7 | Fair |
| Example 7 | 1.89 | 0.10 | 5.32% | 11 | 12 | Fair |
| Example 8 | 2.37 | 0.20 | 8.41% | 12 | 10 | Fair |
| Example 9 | 3.12 | 0.30 | 9.74% | 10 | 10 | Fair |
| Example 10 | 2.30 | 0.10 | 4.36% | 6 | 3 | Good |
| Comparative Example 1 | | Imperfect joining | | Unmeasurable | Unmeasurable | Poor |
| Comparative Example 2 | | Imperfect joining | | Unmeasurable | Unmeasurable | Poor |
| Comparative Example 3 | 0.93 | 0.31 | 33.01% | 320 | 50 | Poor |

TABLE 2-continued

|  | Total contacting length L (mm) | Contour line Length of space x (mm) | (x/L) × 100 (%) | Evaluation after corrosion test | | Comprehensive evaluation |
|---|---|---|---|---|---|---|
|  |  |  |  | Increasing ratio of electric resistance (%) | Decreasing ratio of pull-out strength (%) |  |
| Comparative Example 4 | Breakage of joint part | | | Unmeasurable | Unmeasurable | Poor |
| Comparative Example 5 | 1.32 | 0.82 | 62.00% | 500 | 80 | Poor |

From the evaluation results shown in Table 2, each of the electric wire connection structures of Examples 1 to 10 had an increase ratio of electric resistance suppressed as low as 19% or less, had a decreasing ratio of pull-out strength suppressed as low as 15% or less after the corrosion test, and was excellent in corrosion resistant. On the other hand, the electric connection structures of Comparative Examples 1 and 2 were imperfectly joined and breakage of the joint part occurred in the electric connection structure of Comparative Example 4, and a sound ultrasonic joint part could not be formed in all of these cases. Further, each of the electric connection structures of Comparative Examples 3 and 5 had an increasing ratio of electric resistance of 320% or more, had a decreasing ratio of pull-out strength of 50% or more after the corrosion test, and was poor in corrosion resistant.

What is claimed is:

1. An electric wire connection structure comprising:
one or more copper-based conductor covered electric wires having a copper-based conductor covered part in which a copper-based conductor made of copper or a copper alloy is covered with an insulating cover and a copper-based conductor exposed part in which a part of the insulating cover is stripped by a predetermined length to expose the copper-based conductor; and
one or more aluminum-based conductor covered electric wires having an aluminum-based conductor covered part in which an aluminum-based conductor made of aluminum or an aluminum alloy is covered with an insulating cover and an aluminum-based conductor exposed part in which a part of the insulating cover is stripped by a predetermined length to expose the aluminum-based conductor, wherein
a joint part is provided at a conductor stacked part in which the copper-based conductor exposed part and the aluminum-based conductor exposed part are superposed,
a joint interface of the joint part is provided by only the aluminum-based conductor covered electric wire being melted in a space unjoined which is formed between the copper-based conductor exposed part and the aluminum-based conductor exposed part forming the joint interface so as to fill the space of the copper-based conductor covered electric wire based on cross-section observation,
strands of the aluminum-based conductor exposed part are connected to each other and integrated,
strands of the copper-based conductor exposed part are connected to each other with a gap formed,
the space is filled with aluminum in the aluminum-based conductor exposed part, and
a difference in tensile strength between the copper-based conductor and the aluminum-based conductor is 100 MPa or more.

2. An electric wire connection structure comprising:
one or more copper-based conductor covered electric wires having a copper-based conductor covered part in which a copper-based conductor made of copper or a copper alloy is covered with an insulating cover and a copper-based conductor exposed part in which a part of the insulating cover is stripped by a predetermined length to expose the copper-based conductor; and
one or more aluminum-based conductor covered electric wires having an aluminum-based conductor covered part in which an aluminum-based conductor made of aluminum or an aluminum alloy is covered with an insulating cover and an aluminum-based conductor exposed part in which a part of the insulating cover is stripped by a predetermined length to expose the aluminum-based conductor, wherein
an ultrasonic joint part is provided at a conductor stacked part in which the copper-based conductor exposed part and the aluminum-based conductor exposed part are superposed, and
a joint interface of the ultrasonic joint part satisfies a relational expression of
$(x/L) \times 100 \leq 10\%$
where a total contacting length which is a summed length of a part at which the copper-based conductor exposed part and the aluminum-based conductor exposed part contact is L and a summed length of a contour line of a space formed at a part at which the copper-based conductor exposed part and the aluminum-based conductor exposed part are separate is x based on cross-section observation, and
wherein the joint interface of the ultrasonic joint part is provided by only the aluminum-based conductor covered electric wire being melted in a space unjoined which is formed between the copper-based conductor exposed part and the aluminum-based conductor exposed part forming the joint interface so as to fill the space of the copper-based conductor covered electric wire based on cross-section observation,
strands of the aluminum-based conductor exposed part are connected to each other and integrated,
strands of the copper-based conductor exposed part are connected to each other with a gap formed,
the space is filled with aluminum in the aluminum-based conductor exposed part, and
a difference in tensile strength between the copper-based conductor and the aluminum-based conductor is 100 MPa or more.

3. The electric wire connection structure according to claim 1, wherein the electric wire connection structure further comprises a joint tube in which an ultrasonic joint part is provided at an outer peripheral side of the conductor stacked part.

4. The electric wire connection structure according to claim 2, wherein the electric wire connection structure further comprises a joint tube in which an ultrasonic joint part is provided at an outer peripheral side of the conductor stacked part.

5. The electric wire connection structure according to claim 1, wherein the electric wire connection structure further comprises a joint tube in which an ultrasonic joint part is provided at an outer peripheral side of the conductor stacked part.

6. The electric wire connection structure according to claim 2, wherein the electric wire connection structure further comprises a joint tube in which an ultrasonic joint part is provided at an outer peripheral side of the conductor stacked part.

\* \* \* \* \*